United States Patent
Tada et al.

(10) Patent No.: US 7,678,323 B2
(45) Date of Patent: Mar. 16, 2010

(54) METHOD OF FORMING A GROOVE

(75) Inventors: Masao Tada, Kariya (JP); Yukio Ishihara, Kariya (JP)

(73) Assignee: Toyota Boshoku Kabushiki Kaisha, Aichi (JP)

( * ) Notice: Subject to any disclaimer, the term of this patent is extended or adjusted under 35 U.S.C. 154(b) by 0 days.

(21) Appl. No.: 12/175,553

(22) Filed: Jul. 18, 2008

(65) Prior Publication Data

US 2009/0049975 A1    Feb. 26, 2009

(30) Foreign Application Priority Data

Aug. 23, 2007    (JP) ............... 2007-217423

(51) Int. Cl.
*B26D 3/06*    (2006.01)
*H05B 6/02*    (2006.01)

(52) U.S. Cl. ............... 264/403; 264/446; 264/163; 264/293; 425/174.8 R; 425/291

(58) Field of Classification Search ............ 264/403, 264/449, 446, 479, 163, 293; 425/174, 174.8, 425/291

See application file for complete search history.

(56) References Cited

U.S. PATENT DOCUMENTS

| | | | | |
|---|---|---|---|---|
| 2,977,729 A | * | 4/1961 | Frechtmann et al. | ........... 53/452 |
| 3,673,300 A | * | 6/1972 | Muhlbach et al. | ........... 264/160 |
| 3,685,562 A | * | 8/1972 | Ausnit | ........... 383/37 |
| 4,064,206 A | * | 12/1977 | Seufert | ........... 264/479 |
| 5,979,931 A | | 11/1999 | Totani et al. | |
| 6,692,019 B2 | | 2/2004 | Sommer | |
| 2001/0010423 A1 | | 8/2001 | Bauer et al. | |
| 2002/0043144 A1 | * | 4/2002 | Reh et al. | ........... 83/881 |
| 2005/0126129 A1 | * | 6/2005 | Nesci | ........... 53/510 |
| 2005/0274160 A1 | * | 12/2005 | Muller et al. | ........... 69/8 |
| 2007/0197363 A1 | * | 8/2007 | Parrotta et al. | ........... 493/68 |

FOREIGN PATENT DOCUMENTS

| | | |
|---|---|---|
| DE | 10122376 | 11/2002 |
| JP | 8-282420 | 10/1996 |
| JP | 9-156445 | 6/1997 |
| JP | 10119690 A * | 5/1998 |
| JP | 2004-82865 | 3/2004 |
| JP | 2004149016 A * | 5/2004 |

OTHER PUBLICATIONS

English machine translation of JP 2004-149016, retrieved for JPO database May 31, 2009.*

(Continued)

*Primary Examiner*—Joseph S Del Sole
*Assistant Examiner*—Timothy Kennedy
(74) *Attorney, Agent, or Firm*—Greenblum & Bernstein, P.L.C.

(57) ABSTRACT

The present method of forming a groove in an inner surface of a member for covering an airbag includes the steps of heating a blade by use of an induction-heating device and pushing the blade against the inner surface of the member. The induction-heating device is preferably a coil for induction heating. In addition, the present method of forming the groove preferably includes the steps of placing the member on a work bench having the coil, supplying alternating current to the coil, bringing the blade close to the coil, pushing the blade against the inner surface of the member, stopping current supply to the coil, and pulling the blade away from the inner surface of the member.

4 Claims, 6 Drawing Sheets

OTHER PUBLICATIONS

English language Abstract of JP 2004-82865, Mar. 18, 2004.
English language Abstract of DE 10122376, Nov. 21, 2002.
English language Abstract of JP 9-156445, Jun. 17, 1997.
English language Abstract of JP 8-282420, Oct. 29, 1996.

* cited by examiner

METHOD OF FORMING A GROOVE

CROSS REFERENCE TO RELATED APPLICATION

This application claims priority from Japanese Patent Application No. 2007-217423 filed Aug. 23, 2007. The entire content of this priority application is incorporated herein by reference.

TECHNICAL FIELD

The present invention relates to a method of forming a groove in an inner surface of a member for covering an airbag.

BACKGROUND OF THE INVENTION

A known airbag device includes an airbag and an airbag case that accommodates the airbag therein. The airbag device is mounted in the front passenger seat side of a vehicle in some cases. In these cases, the airbag device is mounted behind an instrument panel.

The instrument panel is provided with an opening for allowing the airbag to inflate therethrough into the vehicle interior. The opening is, in normal conditions, covered with an airbag lid. In a crash of the vehicle, the airbag inflates, pushes the airbag lid from behind, and thereby opens the opening.

The airbag device has an airbag lid manufactured integrally with the instrument panel these days, whereby the airbag lid is invisible from the outer surface side of the instrument panel. The instrument panel with this type of airbag device has a groove in the inner surface. The groove has a depth to the extent not to reach the outer surface. The groove surrounds an area, and the area defines the airbag lid. Note that the groove is referred to as "a tear line" or the like in some cases.

A known method of forming the groove is described in Japanese unexamined patent application publication No. 2004-82865. In the method, a heated blade is pushed against the inner surface of the instrument panel. With the method, the groove having the depth to the extent not to reach the outer surface of the instrument panel is formed in the inner surface of the instrument panel.

In another known method, laser light is emitted onto the inner surface of the instrument panel. Also with this method, the groove having the depth to the extent not to reach the outer surface of the instrument panel is formed in the inner surface of the instrument panel.

The known methods of forming the groove have problems as below.

With the method of forming the groove by use of the heated blade, the blade edge is heated with a heater or the like installed at the base of the blade. Therefore, heat conduction to the blade edge is not uniform, which causes unevenness in temperature at the blade edge. This results in a problem that it is difficult to form the groove having a uniform depth and width in the inner surface of the instrument panel.

Also with the known method of forming the groove, when the blade edge is heated, the blade edge is difficult to be cooled. This causes molten resin to be partially raised by the blade edge when the blade edge is pushed against the inner surface of the instrument panel and then pulled up. This results in the problem that it is difficult to form the groove having the uniform depth and width in the inner surface of the instrument panel.

As for the method of forming the groove by use of the laser light, since the laser light is equal to or more than 1 mm in width, the formed groove is unexpectedly wider. This causes a problem that the groove formed in the inner surface of the instrument panel can be seen through the outer surface of the instrument panel. That is, there is the problem that the groove formed in the inner surface of the instrument panel is unexpectedly visible from the outer surface side.

SUMMARY OF THE INVENTION

The present invention was completed based on the above situation, and its purpose is to form a groove having a uniform width and depth in an inner surface of a member for covering an airbag such as an instrument panel.

A first aspect of the present invention is a method of forming a groove in an inner surface of a member. The member can cover an airbag. The method includes the steps of heating a blade by use of an induction-heating device, and pushing the blade against the inner surface of the member.

In accordance with the first aspect of the present invention, because the blade is heated by the use of the induction-heating device, the groove having a uniform width and depth can be formed in the inner surface of the member for covering the airbag.

Also in accordance with the first aspect of the present invention, only a blade edge can be heated by the use of the induction-heating device. Therefore, the blade edge can be heated and cooled within a short time period. The groove having the uniform and accurate width and depth thus can be formed in the inner surface of the member for covering the airbag.

A second aspect of the present invention is the method according to the first aspect of the present invention, wherein the induction-heating device includes a coil for induction heating. The method further includes the steps of placing the member on a work bench, the work bench including the coil, supplying alternating current to the coil, bringing the blade close to the coil, pushing the blade against the inner surface of the member, stopping the current supplied to the coil, and pulling the blade away from the inner surface of the member.

In accordance with the second aspect of the present invention, the blade can be pulled away from the inner surface of the member after current supply to the coil for induction heating is stopped. Therefore, the groove having the uniform width and depth can be formed in the inner surface of the member for covering the airbag.

A third aspect of the present invention is the method according to the first or second aspect of the present invention, wherein the member includes a skin of a vehicle interior material.

In accordance with the third aspect of the present invention, the groove having the uniform width and depth can be formed in the inner surface of the skin of the vehicle interior material.

A fourth aspect of the present invention is the method according to any one of the first to third aspects of the present invention, wherein the skin is genuine leather.

In accordance with the fourth aspect of the present invention, the groove having the uniform width and depth can be formed in the inner surface of the skin made of genuine leather.

A fifth aspect of the present invention is the method according to the third aspect of the present invention, wherein the vehicle interior material includes an instrument panel.

In accordance with this aspect of the present invention, the groove having the uniform width and depth can be formed in the inner surface of the instrument panel for covering the airbag.

A sixth aspect of the present invention is the method according to any one of the first to fifth aspects of the present invention, wherein the blade includes a thin blade.

In accordance with the sixth aspect of the present invention, the narrower groove can be formed. Therefore, the groove is difficult to be seen from the outer surface side.

In accordance with the present invention, the groove having the uniform width and depth can be formed in the inner surface of the member, such as the instrument panel, for covering the airbag.

DETAILED DESCRIPTION

An embodiment in accordance with the present invention will be now described with reference to drawings.

Figure 1:
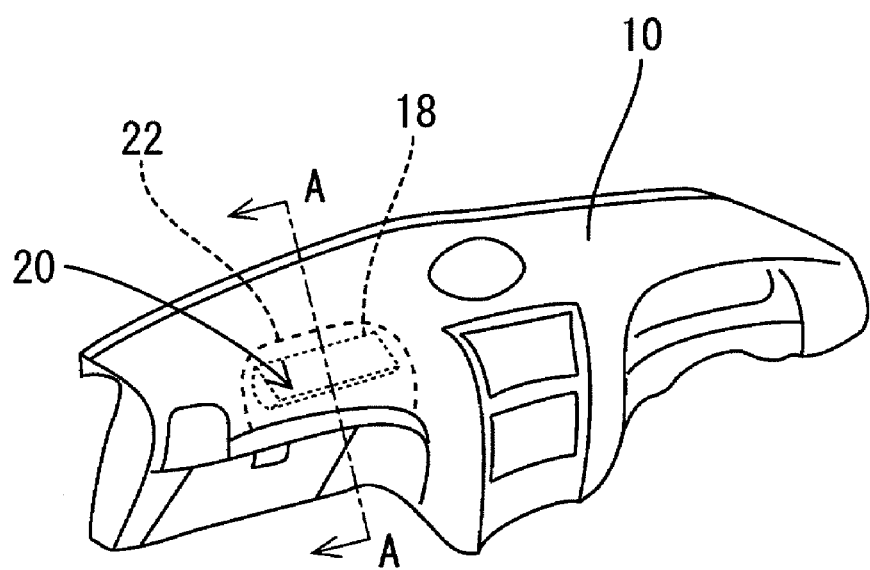
FIG. 1 is a perspective view of an instrument panel.
Figure 2:
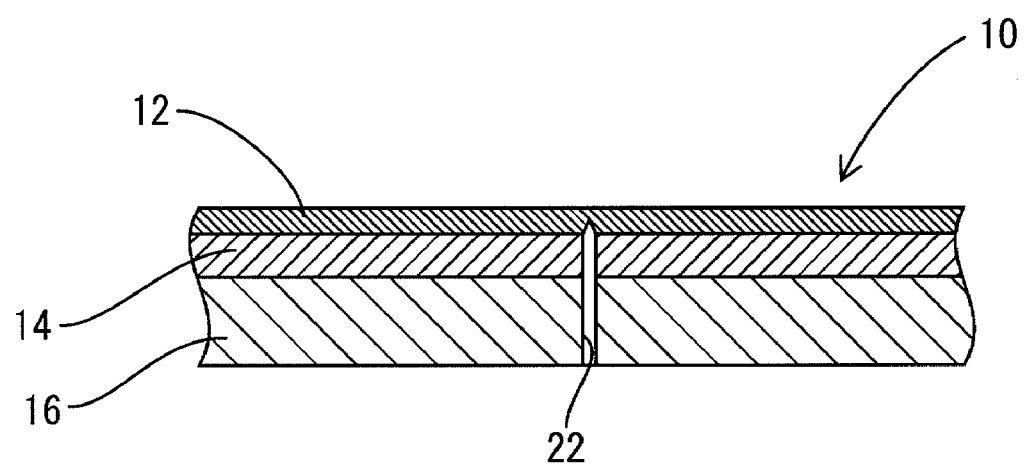
FIG. 2 is a sectional view of the instrument panel taken along line A-A of FIG. 1.

FIG. 1 is a perspective view of an instrument panel 10. FIG. 2 is a sectional view of the instrument panel shown in FIG. 1 taken substantially along line A-A.

As shown in FIGS. 1 and 2, the instrument panel 10 that is a kind of vehicle interior materials includes a skin 12, a cushion 14, and a base 16. The skin 12, the cushion 14, and the base 16 are laminated in that order from an outer surface side to an inner surface side. Note that the skin 12 corresponds to "a member for covering an airbag" of the present invention.

The skin 12 may be made of, for example, genuine leather, synthetic leather, thermoplastic polyolefin resin (TPO resin), flexible polyvinyl chloride resin (PVC resin), thermoplastic polyurethane resin (TPU resin), or the like.

The cushion 14 may be made of, for example, resin foam such as polyurethane foam, polyolefin foam.

The base 16 may be made of, for example, polypropylene (PP) resin alone, or a mixture of PP resin with reinforcing filler such as talc, mica, glass, or else, modified polyphenylene oxide (PPO) resin, acrylonitrile butadiene styrene (ABS) resin, or the like may be used.

As shown in FIGS. 1 and 2, an airbag device 18 is mounted behind the instrument panel 10 in the front passenger seat side. The airbag device 18 includes an airbag and an airbag case. The airbag is accommodated in the airbag case. In a crash of the vehicle, an inflator is activated and thereby instantly inflates the airbag. The airbag device 18 may be any known airbag device.

A groove 22 is formed in the inner surface of the instrument panel 10 in the front passenger seat side. The groove 22 substantially has an inverted U shape. The groove 22 is referred to as a tear line in some cases. The groove 22 has a depth in the inner surface of the instrument panel to the extent not to reach the outer surface.

An area surrounded by the groove 22 defines an airbag lid 20. The airbag lid 20 is integral with the instrument panel 10. The airbag lid 20 is almost invisible from the outer surface side of the instrument panel 10.

When the airbag device 18 is actuated in the crash of the vehicle, the airbag inflates. Then, inflation pressure of the airbag fractures the instrument panel 10 along the groove 22, while pressing the airbag lid 20 from the inner surface side toward the vehicle interior side. As a result, an opening is formed at a place where the airbag lid 20 existed. The airbag inflates through the opening toward the vehicle interior.

Figure 3:
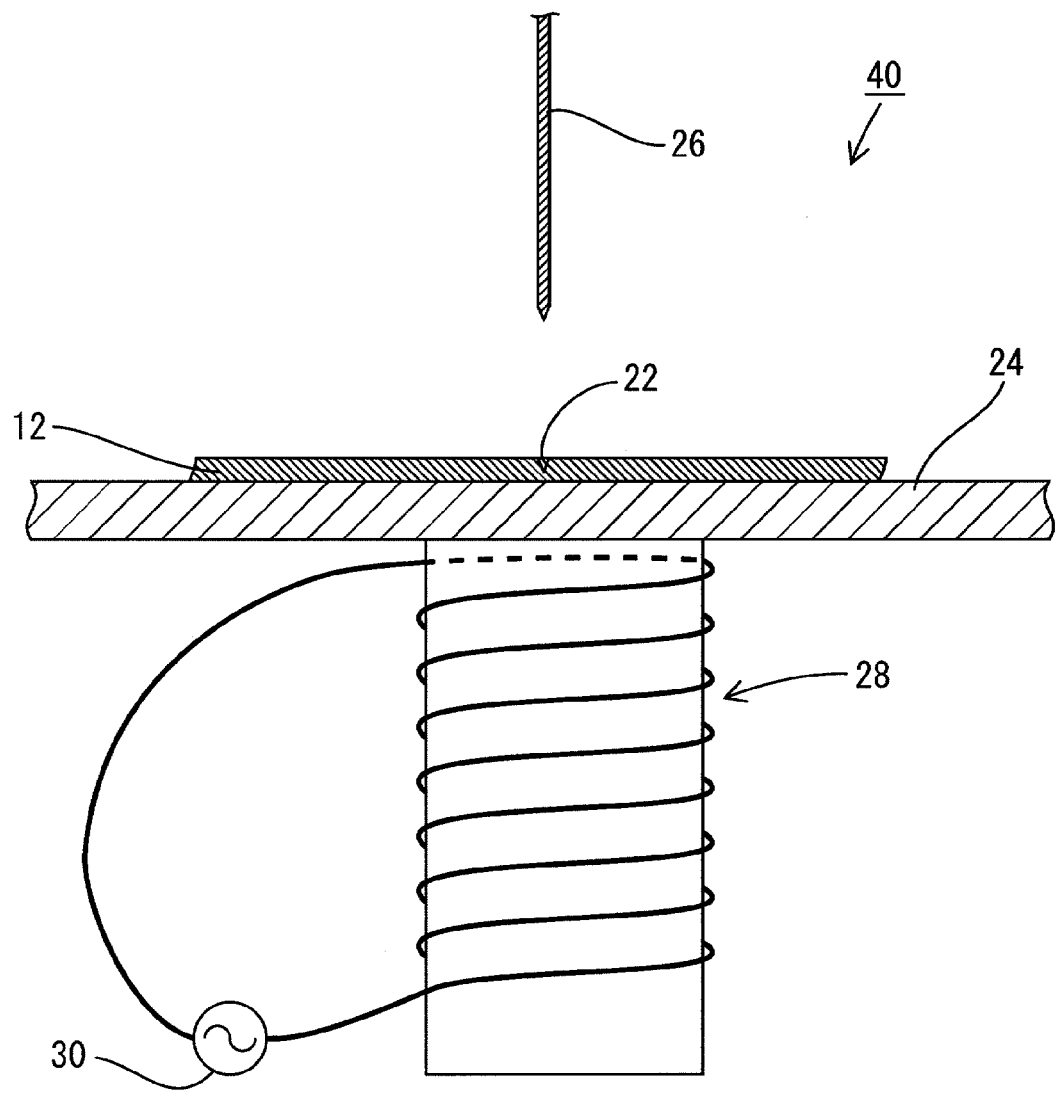
FIG. 3 shows illustrative configurations of a groove forming apparatus for forming a groove in an inner surface of a skin of the instrument panel.

FIG. 3 illustratively shows a groove forming apparatus 40 for forming the groove 22 in the inner surface of the instrument panel 10.

As shown in FIG. 3, the groove forming apparatus 40 includes a work bench 24, a blade 26, a coil 28 for induction heating, and a power source 30. The work bench 24 is arranged to support the skin 12. The blade 26 is made of metal such as stainless steel. The coil 28 is arranged to heat the blade 26. The power source 30 is arranged to supply alternating current to the coil 28.

Figure 4:
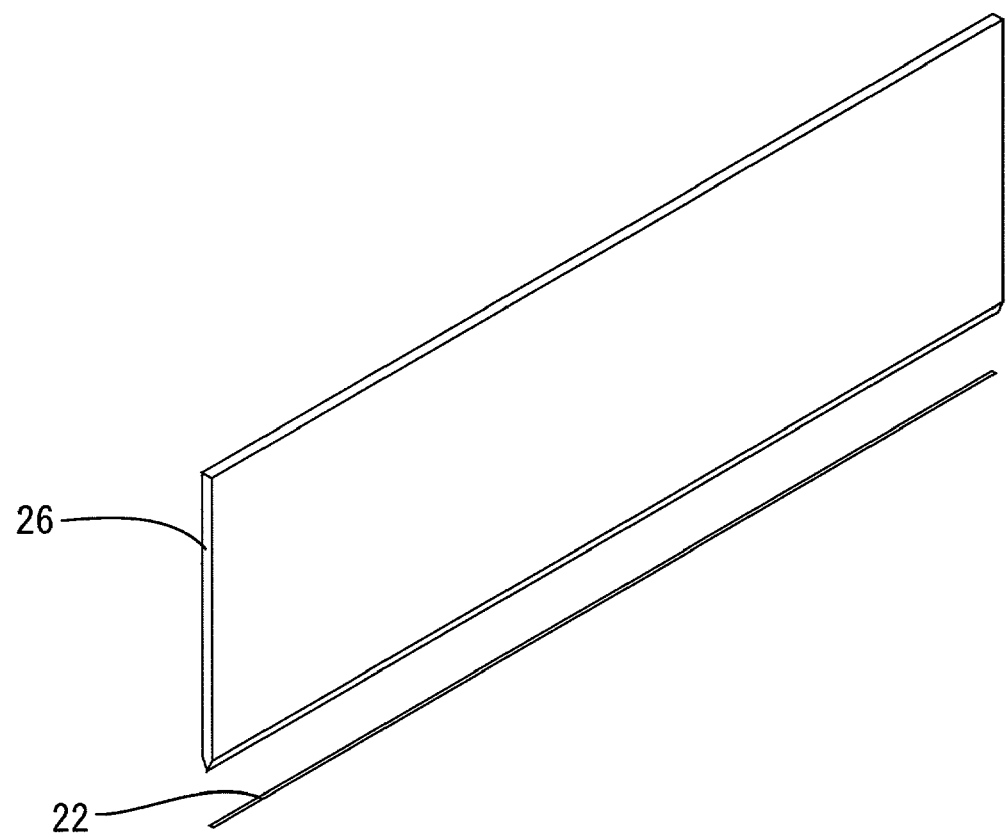
FIG. 4 is a perspective view of a blade having a continuous blade edge.

FIG. 4 is a perspective view of the blade 26. As shown in FIG. 4, the blade 26 used with the groove forming apparatus 40 of this embodiment has a continuous blade edge. The blade 26 is constituted by a thin blade having the blade edge equal to or less than 0.1 mm in thickness.

A method of forming the groove 22 in the inner surface of the skin 12 by use of the groove forming apparatus 40 will be now described.

First, the skin 12 is placed with the inner surface up on the work bench 24.

Next, alternating current (e.g. alternating current of 20 kHz, 2 kW) is supplied to the coil 28 and thereby lines of magnetic force are generated, while the blade 26 is brought close to the coil 28. Since eddy current is thus generated in the surfaces of the blade 26, joule heat is generated and the blade 26 is heated. Note that the coil 28 corresponds to "an induction-heating device" of the present invention.

Next, the heated blade 26 is pushed against the inner surface of the skin 12. The groove 22 is thus formed in the inner surface of the skin 12.

Next, alternating current supply to the coil 28 is stopped. The temperature at the blade edge of the blade 26 thus rapidly decreases, because the heat at the blade edge of the blade 26 transfers to the other portion, i.e. because the heat at the blade edge of the blade 26 dissipates into a base portion of the blade 26 or the surrounding atmosphere.

By the rapid decrease in temperature at the blade edge of the blade 26, the temperature in molten resin existing at the portion abutting against the blade edge of the blade 26 rapidly decreases. Thus, the molten resin is instantly solidified, and thereby the groove 22 having a desired width and depth can be formed.

After then, the blade 26 is pulled away from the inner surface of the skin 12. Thus, the groove 22 having the depth to the extent not to reach the outer surface is formed in the inner surface of the skin 12.

With the method of forming the groove in accordance with this embodiment, the following effects are obtained:

The blade edge of the blade 26 can be evenly heated by the use of the heat-induction device having the coil 28 for induction heating. Therefore, the groove 22 having a uniform width and depth can be formed in the inner surface of the instrument panel.

With the method of this embodiment for forming the groove, the groove 22 can be formed in the inner surface of the skin 12 also after the skin 12, the cushion 14, and the base 16 are laminated.

For example, a groove or a slit are formed in advance in the base 16 and the cushion 14. Next, the skin 12, the cushion 14, and the base 16 are laminated in that order. Next, the heated blade 26 is pushed against the inner surface of the skin 12, and thereby the groove 22 is formed. Thus, the groove 22 having the uniform width and depth can be formed in the inner surface of the instrument panel 10 constituted by the skin 12, the cushion 14, and the base 16.

With the method of forming the groove in accordance with this embodiment, only the blade edge of the blade 26 can be heated by the use of the induction-heating device. Therefore, the blade edge of the blade 26 can be heated within a short time period, and likewise, the blade edge of the blade 26 can be cooled within a short time period.

Therefore, the groove 22 having the uniform width and depth can be formed in the inner surface of the skin 12.

With the method of forming the groove in accordance with this embodiment, the blade 26 is constituted by a thin blade equal to or less than, for example, 0.1 mm in thickness at the blade edge thereof. Therefore, the significantly narrower groove can be formed in the inner surface of the skin 12. Therefore, the airbag lid 20 that is almost invisible from the outer surface side of the instrument panel 10 can be realized.

Other Embodiments

The present invention is not limited to the embodiments described above with reference to the drawings, the following embodiments are also included within the scope of the present invention. Further various variations other than the following embodiments are also possible within the scope of the invention.

Figure 5:
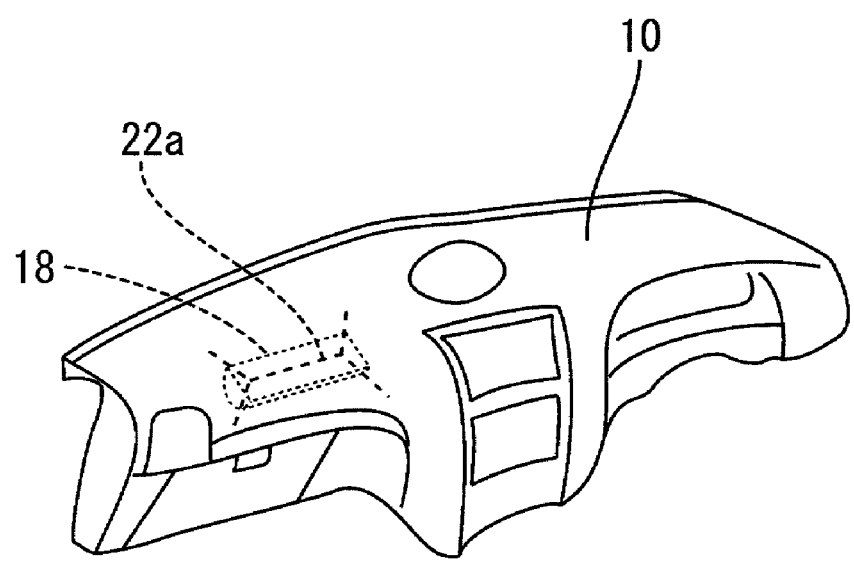
FIG. 5 is a perspective view of the instrument panel having substantially H-shaped groove formed in the inner surface of thereof.

(1) In the above embodiment, the groove 22 illustratively has an substantial inverted U shape, however, the invention is not limited to this. For example, a groove 22a may have a substantial H shape as shown in FIG. 5. Even in this case, the inflation pressure of the airbag can fracture the instrument panel 10 along the groove 22a. Likewise, in the crash of the vehicle, the airbag can be allowed to inflate into the vehicle interior.

Figure 6:
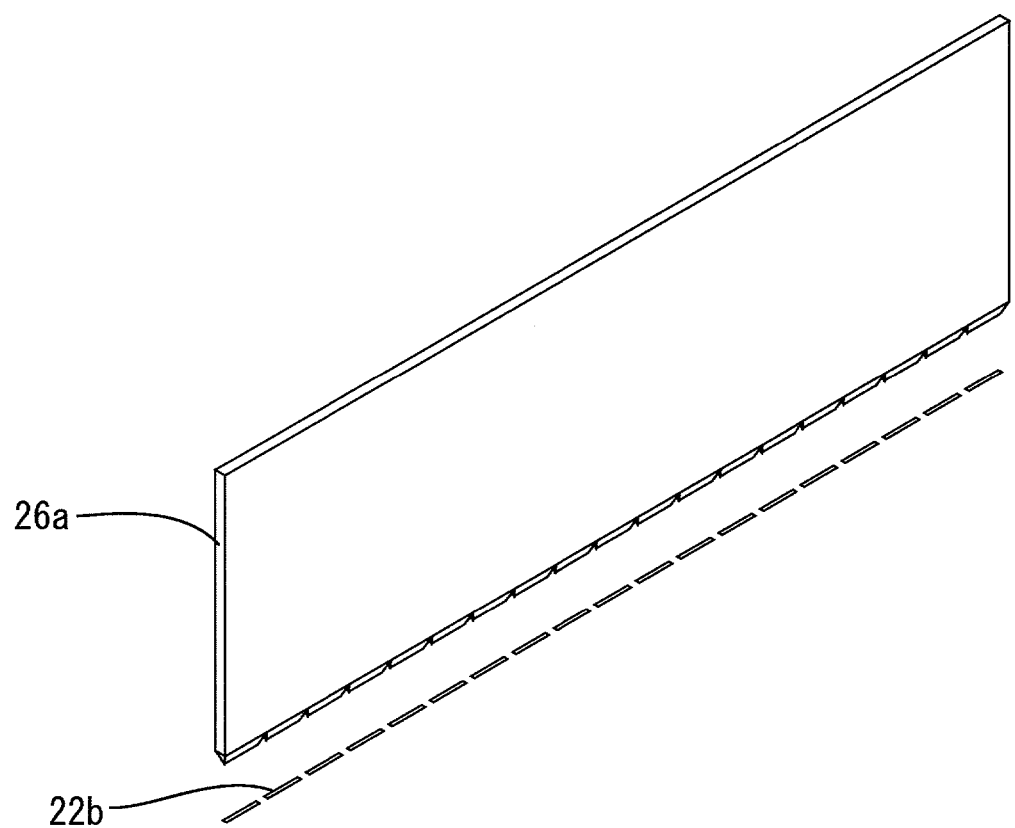
FIG. 6 is a perspective view of a blade having a notched blade edge.

(2) In the above embodiment, the blade 26 illustratively has a continuous blade edge, however, the invention is not limited to this. For example, a blade 26a having a notched blade edge may be used as shown in FIG. 6. In a case where such a blade 26a is used, a dashed-lined groove 22b can be formed in the inner surface of the skin 12.

(3) In the above embodiment, a material of the blade 26 is illustratively stainless steel, however, the present invention is not limited to this. It is only necessary for the material of the blade 26 to be any electrical conducting material which is available for electromagnetic induction heating. The material of the blade 26 may be any electrical conducting material such as, for example, titanium, spring steel, or the like.

(4) In the above embodiment, the member for covering the airbag is illustratively the skin 12 of the instrument panel 10, however, the present invention is not limited to this. The present invention is applicable also for any vehicle interior material other than the instrument panel 10. The present invention is applicable also for any vehicle interior material such as, for example, a steering pad, a door trim, a pillar garnish, or the like.

(5) In the above embodiment, the airbag device 18 is mounted illustratively in the front passenger seat side, however, the present invention is not limited to this. The present invention is applicable also for an airbag to be mounted behind a steering pad, a side airbag, a curtain airbag, or the like.

(6) In the above embodiment, the blade 26 is pushed against illustratively only the skin 12 to form the groove, however, the present invention is not limited to this. The blade 26 may be pushed against the skin 12 and cushion 14 at once after these members are laminated. Or else, the blade 26 may be pushed against the skin 12, cushion 14, and base 16 at once after these members are laminated.

What is claimed is:

1. A method of forming a groove in an inner surface of a skin of a vehicle interior material, the skin being capable of covering an airbag, the method comprising:
   providing the skin, a work bench, a coil for induction-heating disposed below the work bench, and a thin blade disposed above the coil across the work bench;
   placing the skin with the inner surface up on the work bench;
   supplying alternating current to the coil;
   placing the thin blade close to the coil so as to heat only a blade edge of the thin blade by induction heating;
   pushing the thin blade against the inner surface of the skin;
   stopping the current supplied to the coil; and
   pulling the thin blade away from the inner surface of the skin.

2. The method according to claim 1, wherein the skin is genuine leather.

3. The method according to claim 1, wherein the vehicle interior material includes an instrument panel.

4. The method according to claim 1, wherein the thin blade has a blade edge equal to or less than 0.1 mm in thickness.

* * * * *